UNITED STATES PATENT OFFICE.

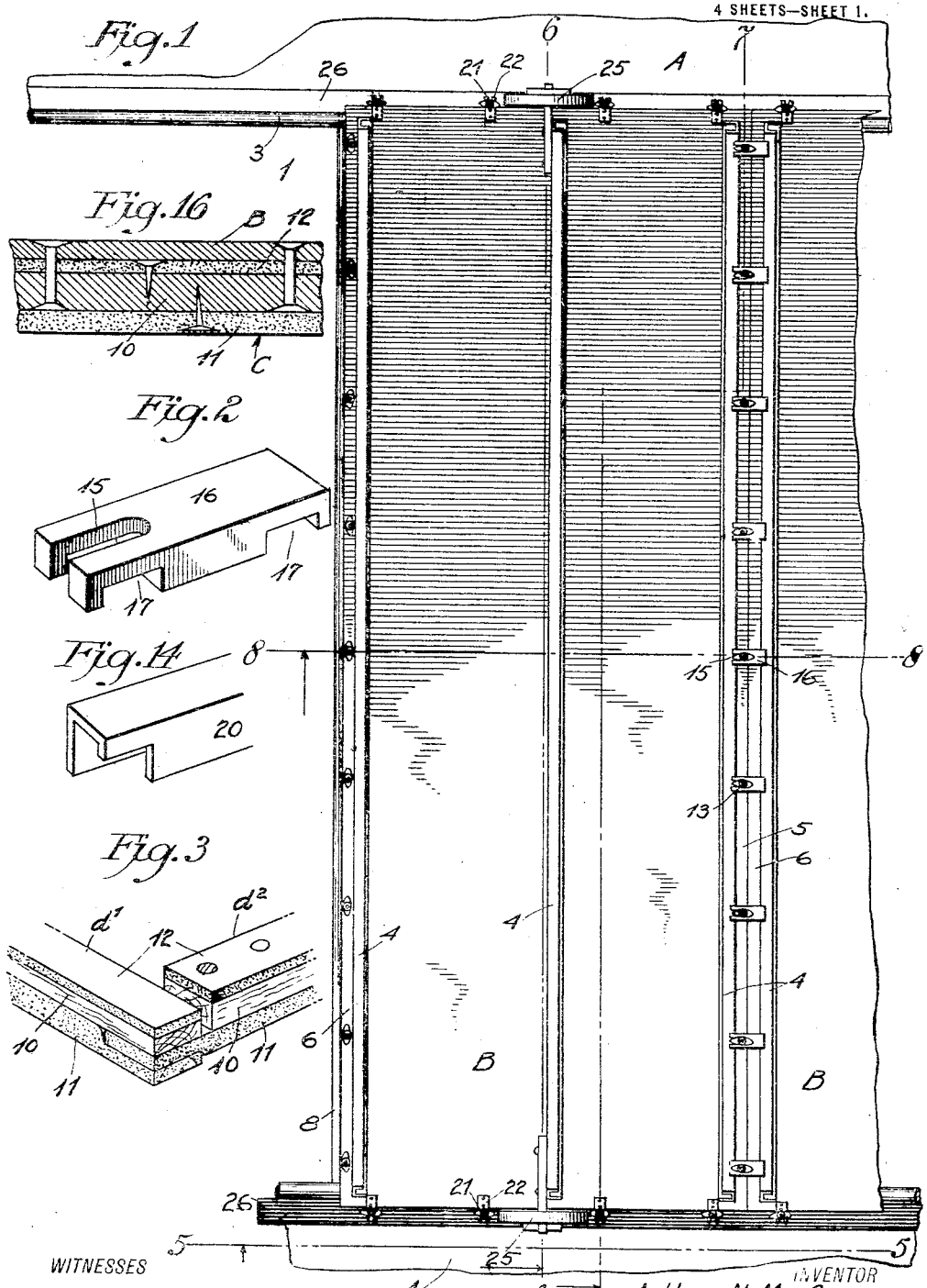
A. N. McGRAY.
HATCH COVER FOR SHIPS.
APPLICATION FILED SEPT. 18, 1914.
1,158,946.
Patented Nov. 2, 1915.
4 SHEETS—SHEET 1.
INVENTOR
Arthur N. McGray

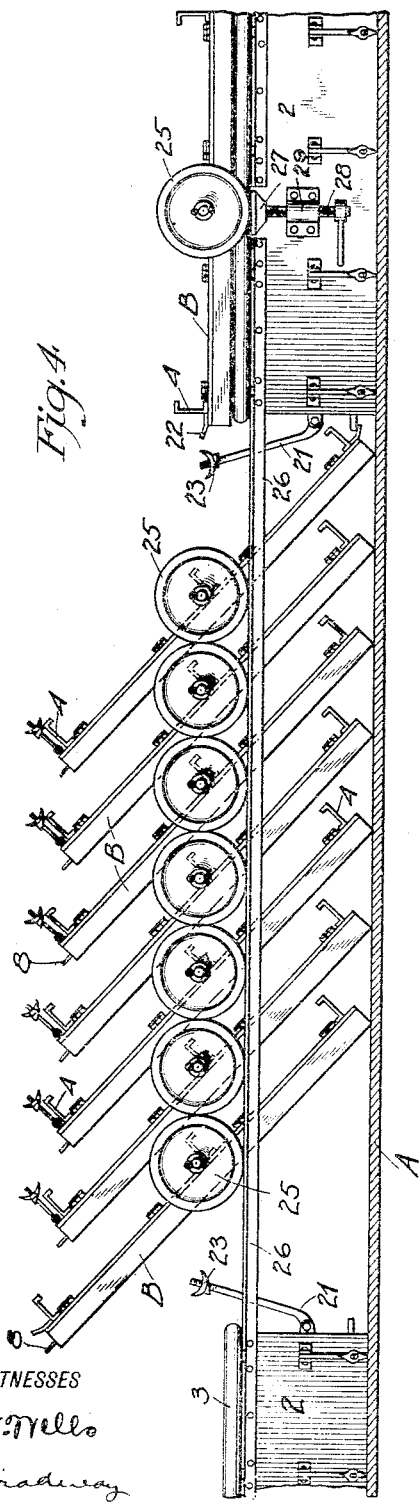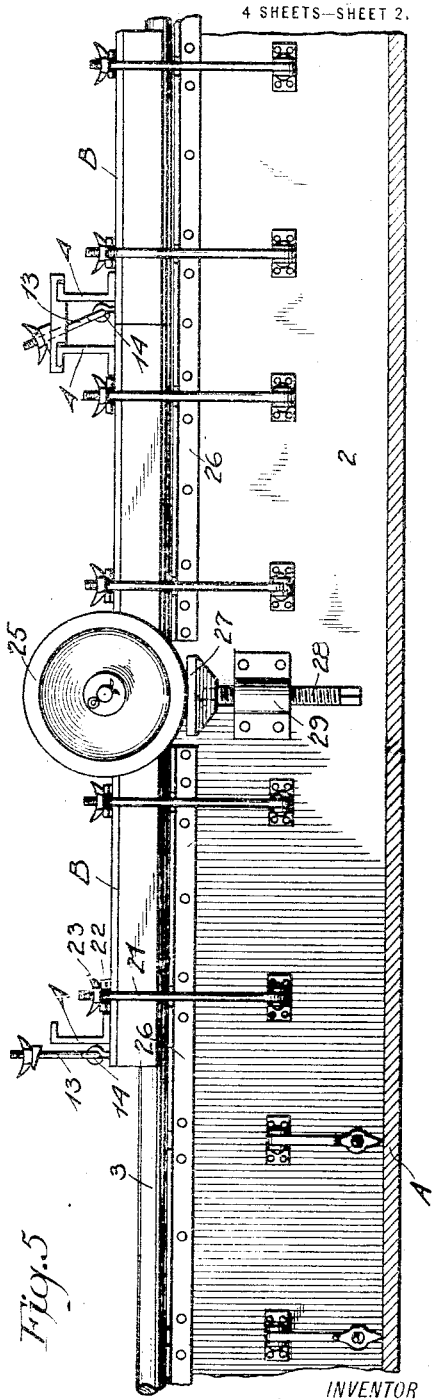

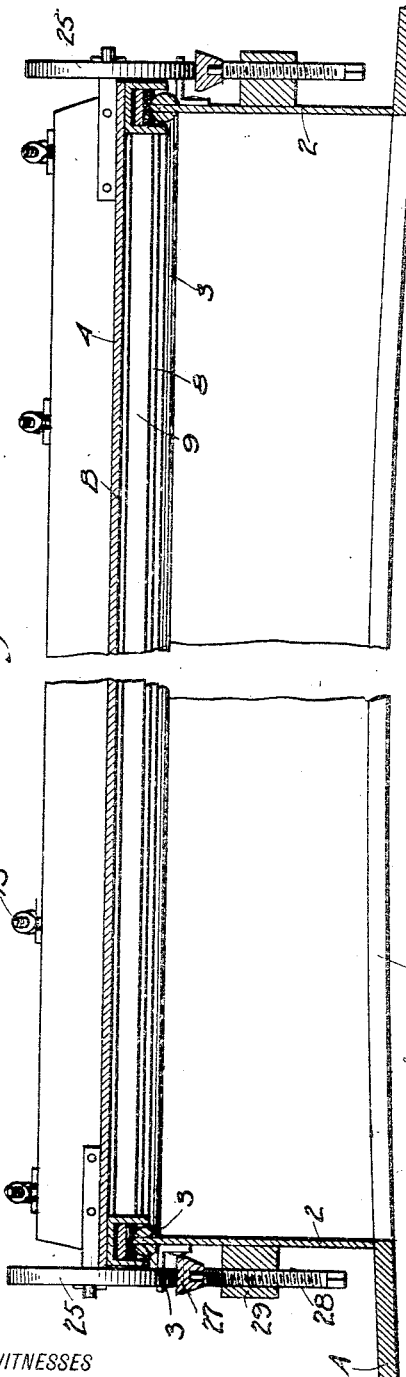
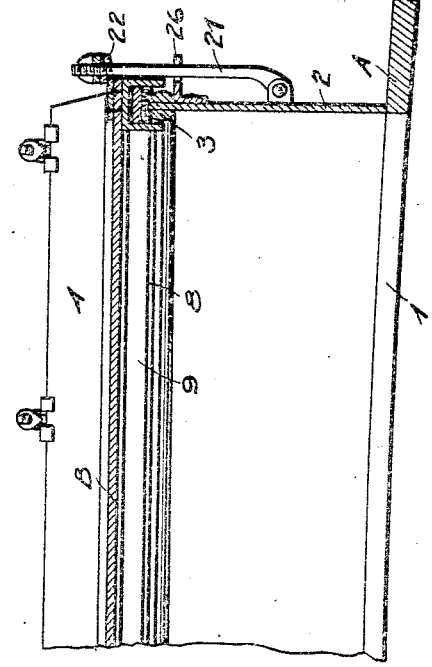
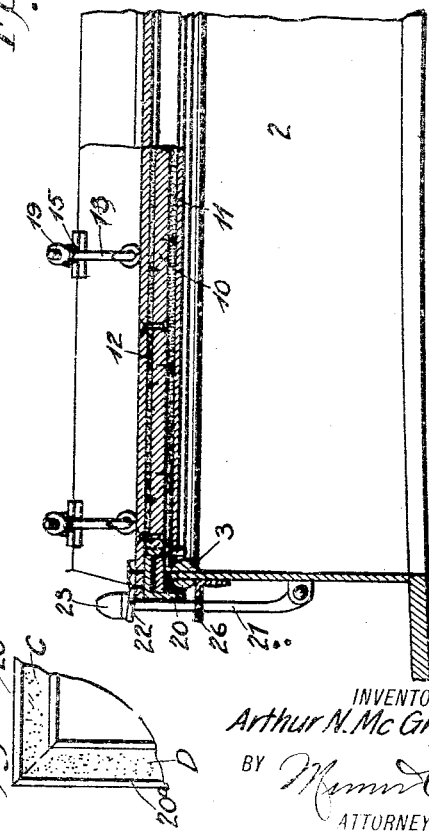

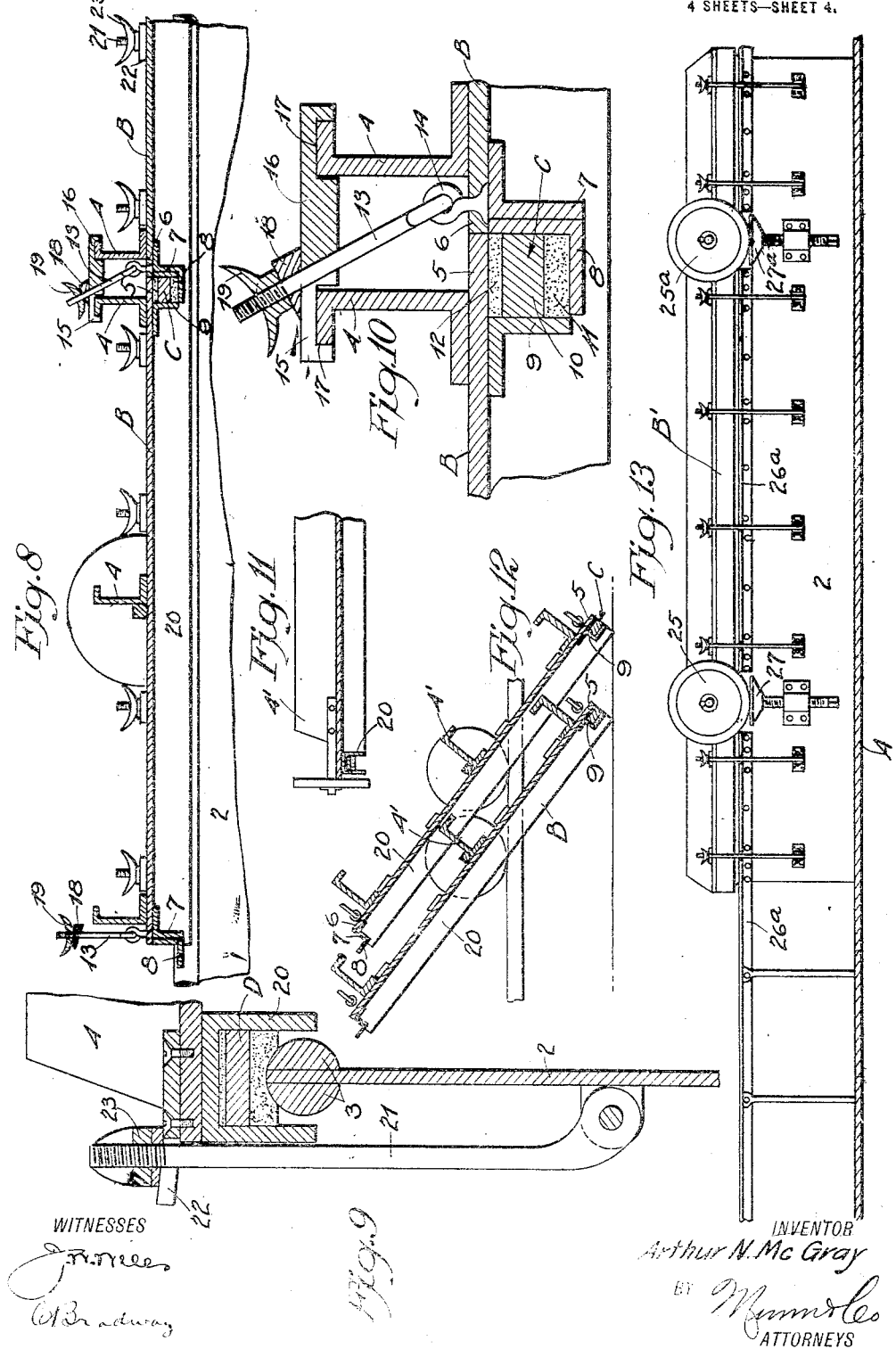

ARTHUR N. McGRAY, OF NEW YORK, N. Y.

HATCH-COVER FOR SHIPS.

1,158,946.   Specification of Letters Patent.   Patented Nov. 2, 1915.

Application filed September 18, 1914. Serial No. 862,315.

*To all whom it may concern:*

Be it known that I, ARTHUR N. McGRAY, a citizen of the United States, and a resident of the city of New York, borough of Manhattan, in the county and State of New York, have invented a new and Improved Hatch-Cover for Ships, of which the following is a full, clear, and exact description.

This invention relates to hatch covers for ships, although it is not necessarily limited to this particular use, and in the embodiment of the invention as a ship hatch cover, the present application has to deal with improvements in hatch covers of that type disclosed in United States Letters Patent Number 934,456, granted to me September 21, 1909, wherein wheels are provided on the hatch cover or cover sections that run on track rails in moving the cover or cover sections to and from open position, the cover or cover sections being capable of pivoting on the wheels as centers, so that when in open position they may be disposed vertically side by side.

The general objects of the present invention are to improve the construction of hatch covers whereby they can be placed in closed position with the greatest dispatch and a minimum of labor, tightly battened down, successively withstand the downward crushing strains due to the breaking of heavy waves thereon, and effectively brace the coamings of the hatch opening without the use of strong-backs or stiffening bars extending across or obstructing such opening. While these objects are capable of being carried out in connection with pivoted and wheel-supported hatch coverings or sections, they are also capable of being embodied in other types of hatch covers.

In carrying out the invention the hatch covers or sections are provided at their ends with channel bars which are adapted to embrace the upper edges of the coamings, and in these channel bars are packing strips of novel form, whereby water-tight joints are provided between the hatch covers and coamings when the covers are bolted down, and as the hatch covers are reinforced by stiffening bars extending longitudinally thereof, the covers themselves form bracing means between opposite coamings, so that the pounding of waves on the coamings is effectively resisted.

Where the hatch cover is made in sections the meeting edges of adjacent sections are provided with means for obtaining effectively watertight joints, there being on one section a packing strip with which engages the adjacent section, and by means of suitable drawing devices one section is drawn upwardly and the other downwardly to thereby clamp between them the packing strip. When a single cover is used for a hatch opening the marginal channel bars will be provided at all four edges, and in these channel bars will be the packing strips to insure a watertight joint.

In order to provide for the quick handling of the hatch covers or sections tracks are arranged on the end coamings and extend to one side of the hatch opening, and on the hatch covers or sections are wheels which ride on the track rails, whereby the cover sections can be trundled to and from open position, and where there is a lack of space between adjacent hatch openings the cover sections can be nested one under another at an angle to the horizontal when in open position, so as to take up comparatively little room. The track rails include portions which can be raised and lowered for the purpose of raising and lowering the cover sections from and to closed position, it being understood that, owing to the coaming-embracing channel bars on the cover sections the latter must be raised to a height to enable the channel bars to clear the coaming in sliding the cover sections to and from the hatch opening.

For a more complete understanding of the invention, reference is to be had to the accompanying drawings, taken in connection with the following description and claims, which drawings illustrate certain embodiments of the invention and wherein similar characters of reference indicate corresponding parts in all the views, and in which Figure 1 is a plan view of a portion of a hatch opening with a cover section and part of an adjacent section in closed position; Fig. 2 is a perspective view of one of the plates or dogs of the means for drawing adjacent sections into watertight relation; Fig. 3 is a perspective view of the joint between the packing strips at the corner of the cover section; Fig. 4 is a sectional view of a deck, showing in elevation two adjacent hatchways with the cover sections of one nested together in open position; Fig. 5 is an enlarged view of one end of a hatchway with some of its cover sections battened down; Fig. 6 is an enlarged sectional view on the line 6—6, Fig. 1, taken athwart ship or longitudinally of a cover section; Fig. 7 is a similar view taken on the line 7—7, Fig. 1; Fig. 8 is an enlarged sectional view on the line 8—8, Fig. 1; Fig. 9 is a detail sectional view of the water-tight joint between the hatch cover and the hatch coaming; Fig. 10 is a detail sectional view of the water-tight joint between adjacent cover sections; Fig. 11 is a detail sectional view of a modified form of hatch cover; Fig. 12 is a sectional view showing the manner of nesting the cover sections constructed as shown in Fig. 11; Fig. 13 is an elevation of a modified form of hatchway in which the cover is in a single piece and has a plurality of wheels at each end, whereby the covers yield to and from open position while maintained horizontal; Fig. 14 is a detail view of the end of a packing housing channel bar at the meeting edge of a cover section; Fig. 15 is a fragmentary bottom plan view of a corner of a hatch cover or section; and Fig. 16 is an enlarged fragmentary sectional view of the water-tight joint between the meeting edges of two hatch sections.

Referring to the drawings, A designates a ship deck which has a hatch opening 1 of any desired size, and around this opening are the coamings 2 suitably fastened to the deck, the upper edges of the coamings being provided with half around metal strips 3 for stiffening the coamings.

When the hatch opening is of considerable dimensions the cover therefor is made in a plurality of sections B which may be made of metal plates, although they may be constructed in any other suitable manner. To withstand downward crushing strains each cover section has on its upper side a plurality of channel or other metal bars 4. At the meeting edges 5 and 6 of adjacent cover sections a watertight joint is provided and this joint is so constructed that the sections can be clamped together with a minimum of labor. On the under side of one section at the edge 6 is fastened a Z-bar 7 constructed if desired of oppositely-disposed angle-irons fastened back to back. The flange 8 of the Z-bar forms a ledge that projects outwardly beyond the edge 6 of the cover section to which it is fastened, and extends under the edge 5 of the adjacent cover section, so that between this ledge and the under side of the adjacent cover section a packing strip C is confined, this strip being backed by an angle-bar 9 fastened to the under side of the cover section which carries the packing strip. This packing strip consists of a bar of wood or equivalent material 10 and has tacked or otherwise fastened to the under side thereof a strip 11 of felt, rubber or other suitable resilient material. This resilient material bears against the ledge or flange 8 of the Z-bar and forms a seal between the two cover sections. If desired, the upper side of the wooden strip 10 may be provided with a strip 12 of compressible material which engages the under side of the cover section to which the packing strip is bolted, riveted or otherwise fastened. By employing a filler strip of wood between the strips of packing material 11 and 12, the latter can be kept in better form and more effectively fastened to the hatch cover. In Fig. 16 the manner of securing the various parts of the packing strips together and to the cover section is shown. With a packing strip of the character described it is necessary to draw one cover section upwardly and the other downwardly so as to place the packing element under compression. For this purpose eye-bolts 13 are hingedly connected at 14 with the Z-bar-carrying edge 6 of the cover section, and these bolts extend upwardly at an angle over the edge 5 of the adjacent cover section and pass through slots 15 in the dogs or plates 16 that rest on the stiffening bars 4 on the adjacent margins of juxtaposed cover sections. The under side of each dog has recesses 17 to engage the upper edges of the stiffening bars 4, so as to prevent slipping transversely of such bars. On the upper end of each bolt 13 is a beveled washer 18 and a wing or equivalent nut 19, so that when the nuts are turned to screw on the bolts, a clamping action is produced on the packing strip C by the Z-bar-carrying section being drawn upwardly and the packing strip-carrying section being drawn downwardly. These bolts and dogs also serve to mechanically connect adjacent sections together, so that when all the sections of a hatch cover are battened down they form a rigid unitary structure which effectively resists strains applied in different directions.

Water-tight joints are provided between the coamings and outer edges of the hatch cover or cover sections by means of channel bars 20 fastened to the under side of the cover, which channel bars are of sufficient width to receive the upper edges of the coamings, and furthermore, these channel bars form housings for packing strips which are similar to the packing strips C. These packing strips are held under compression by the toggle bolts 21 hingedly fastened to the outer surfaces of the coamings and adapted to engage forked lugs 22 fastened to and projecting from the edges of the hatch cover, there being winged nuts 23 on the bolts 21, whereby the tightening of the bolts forces the hatch cover downwardly and presses the packing strips D between the coamings and channel bars. These channel bars by embracing the coamings serve also to rigidly connect the hatch cover with the coamings, whereby one coaming is braced by the other through the hatch cover, thus doing away with the necessity of strong-backs or stiffening bars across the hatchway. When the hatch covering is made in sections the side edges of the outer sections will have channel-bars 20$^a$, as shown in Fig. 15, in addition to the channels 20 at the ends, and these side channels 20$^a$ will have packing strips D for the purpose described. In a single piece cover as shown in Fig. 13, the channel packing strip housings will extend entirely around the margin or four edges of the cover.

At the corners of the cover sections the packing strips are joined as shown in Fig. 3. The strip $d'$ in this Fig. has the packing element disposed in the channel-iron at the end of a cover section and the packing element $d^2$ is the one arranged at the meeting edges of the cover sections, and it will be noted that the lower piece of resilient material 11 of the element $d^2$ overlaps the end of the corresponding strip 11 of the packing element $d'$, but the ends of the strips 10 and 12 of the element $d^2$ butt against the sides of the corresponding strips of the element $d'$. By making the joint in this manner there is no possibility of water entering between the coamings and the cover sections at the corners.

To enable the cover sections to be moved to and from open position with facility, each cover section B has a centrally disposed wheel 25 at each end, and these wheels are adapted to run on track rails 26 fastened to the end coamings and extending laterally of the hatchway. If the hatchways are close together, as shown in Fig. 4, the track rails 26 extend from one hatchway to the next, and the portion of the rails between the hatchways can be utilized for the stowage of the cover sections of either hatchway. When the space between the hatchways is limited the cover sections can be nested together, as shown in Fig. 4. To nest the cover sections more closely together the ends of the strong-backs or reinforcing bars 4' can be cut off as shown in Fig. 11, so that the stiffening bars 4' of one cover section can nest into the under side of the adjacent cover section by the stiffening bars fitting between the coaming-engaging channel bars at the ends of the cover sections. When the height of the track rails is less than half the width of the cover sections the latter will, when nested together, be inclined to the horizontal. The track rails 26 are provided with movable sections 27 mounted on screws 28 that are threaded in bearings 29 on the coamings. By means of these movable sections of the track rails the cover sections can be let down onto the coamings, as when the cover sections are to be battened down or raised from the coamings so that the angle bars on the under side of the cover sections will clear the coamings as the cover sections are trundled off the hatchway.

In Fig. 13 the cover B' is made in one piece and covers a single hatch, and in this case the cover is provided at each end with a plurality of wheels 25$^a$, as the cover is not intended to pivot, as is the case with the cover sections having centrally-disposed wheels. The cover B', Fig. 13, moves on and off the hatchway in a horizontal position, and the wheels normally rest on the movable sections 27$^a$ of the track rails 26$^a$. This construction shown in Fig. 13 is suitable for decks where there is plenty of room at one side of the hatchway to receive the cover when the hatch is open.

Where the longitudinal and end packing strips meet, as shown in Fig. 3, the channel bar 20 has a recess 20$^b$ cut in one side, as shown in Fig. 14, so that the piece 11 of the strip $d^2$ can enter the channel and overlap the piece 11 of the strip $d'$.

Having thus described my invention, I claim as new and desire to secure by Letters Patent:

1. The combination of hatchway coamings, a cover resting on the coamings, channels on the under side of the cover and embracing the coamings, and packings in the channels to seal the joints between the coamings and cover, said packing consisting of strips of resilient material, and an interposed strip of rigid material to which the resilient material is attached.

2. The combination of a hatchway, a cover therefor made in sections, a packing strip secured to one section, means on the other section for engaging the packing strip, and means for drawing one section upwardly and the other downwardly to hold the strip under compression.

3. The combination of a hatchway, a cover made in sections, a Z-bar on the under side of one section and having a flange projecting beyond one edge thereof and extending under the adjacent edge of a juxtaposed section, and a packing strip disposed between the said flange and the bottom of the juxtaposed section of the hatch cover.

4. The combination of a hatchway, a cover made in sections, a Z-bar on the under side of one section and having a flange projecting beyond one edge thereof and extending under the adjacent edge of a juxtaposed section, a packing strip disposed between the said flange and the bottom of the juxtaposed section of the hatch cover, and means for drawing the sections together and holding the packing strip under compression.

5. The combination of a hatchway, a cover therefor made in sections, angle-bars fastened to the under side of one section and set in from one edge thereof, a packing strip disposed under the said edge and against the angle bar, an angle bar on the adjacent cover section and having a flange engaging under the packing strip, and means for drawing the cover sections together for compressing the packing strip.

6. The combination of a hatchway, a cover therefor made in separable sections and adapted to meet, a packing for the meeting edges of the sections, stiffening bars fastened to the sections and extending along the meeting edges thereof, draft bolts fastened to one of the sections, and plates engaged with the said stiffening bars and through which the bolts extend, whereby the tightening of the bolts draws the cover sections together and compresses the packing.

7. The combination of a hatchway, a cover therefor made in sections closing in edge to edge, stiffening bars fastened to the sections along the meeting edges thereof, a packing for sealing the joint between the meeting edges, bolts hingedly connected to one section and extending upwardly at an angle across the joint between the sections, plates having recesses to receive the upper edges of the stiffening bars and having slots through which the bolts pass, and nuts on the bolts for drawing the cover sections together and producing a watertight joint between the meeting edges thereof.

In testimony whereof I have signed my name to this specification in the presence of two subscribing witnesses.

ARTHUR N. McGRAY.

Witnesses:
  CHATTEN BRADWAY,
  PHILIP D. ROLLHAUS.